US010244517B2

(12) United States Patent
Seo et al.

(10) Patent No.: US 10,244,517 B2
(45) Date of Patent: Mar. 26, 2019

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/358,007

(22) PCT Filed: Nov. 13, 2012

(86) PCT No.: PCT/KR2012/009544
§ 371 (c)(1),
(2) Date: May 13, 2014

(87) PCT Pub. No.: WO2013/070050
PCT Pub. Date: May 16, 2013

(65) Prior Publication Data
US 2014/0307700 A1 Oct. 16, 2014

Related U.S. Application Data

(60) Provisional application No. 61/559,139, filed on Nov. 13, 2011, provisional application No. 61/598,302, (Continued)

(51) Int. Cl.
*H04W 72/04* (2009.01)
*H04L 5/00* (2006.01)
(52) U.S. Cl.
CPC ......... *H04W 72/042* (2013.01); *H04L 5/0048* (2013.01); *H04L 5/0051* (2013.01); *H04L 5/0053* (2013.01); *H04W 72/0406* (2013.01)

(58) Field of Classification Search
CPC .. H04W 72/042; H04L 5/0051; H04L 5/0053; H04L 5/0058
See application file for complete search history.

(56) References Cited

U.S. PATENT DOCUMENTS 8,537,862 B2 * 9/2013 Blankenship ......... H04L 5/0053
370/252
2011/0013615 A1 1/2011 Lee et al.
(Continued)

FOREIGN PATENT DOCUMENTS

CA 2875778 11/2011
CN 102170703 8/2011
(Continued)

OTHER PUBLICATIONS

LG Electronics, "Remaining Details in Non-Interleaving R-PDCCH Transmission," 3GPP TSG RAN WG1 Meeting #63, R1-106135, Nov. 2010, 8 pages.
(Continued)

*Primary Examiner* — Walter J Divito
*Assistant Examiner* — Anthony Luo
(74) *Attorney, Agent, or Firm* — Lee Hong Degerman Kang Waimey

(57) ABSTRACT

A method for enabling a base station to transmit control information in a wireless communication system according to one embodiment of the present invention, comprises a step of transmitting an enhanced physical downlink channel (E-PDCCH) for a terminal using at least one physical resource block pair among a plurality of physical resource block pairs for transmitting the E-PDCCH, wherein the plurality of physical resource block pairs include one or more physical resource block pair sets, and a parameter related to a demodulation reference signal for the E-PDCCH is set with respect to each physical resource block pair set.

6 Claims, 15 Drawing Sheets

Related U.S. Application Data filed on Feb. 13, 2012, provisional application No. 61/650,480, filed on May 23, 2012, provisional application No. 61/661,331, filed on Jun. 18, 2012.

(56) References Cited

U.S. PATENT DOCUMENTS

| | | | |
|---|---|---|---|
| 2011/0170496 A1 | 7/2011 | Fong et al. | |
| 2011/0237283 A1 | 9/2011 | Shan et al. | |
| 2011/0249633 A1 | 10/2011 | Hong et al. | |
| 2011/0274193 A1* | 11/2011 | Yoon | H04J 13/10 375/260 |
| 2012/0054258 A1* | 3/2012 | Li | H04W 72/0406 709/201 |
| 2013/0034064 A1* | 2/2013 | Nam | H04W 72/1294 370/329 |
| 2013/0064216 A1* | 3/2013 | Gao | H04L 5/0016 370/330 |
| 2013/0083750 A1* | 4/2013 | Nazar | H04L 5/0055 370/329 |

FOREIGN PATENT DOCUMENTS

| | | |
|---|---|---|
| CN | 102231913 | 11/2011 |
| CN | 102256358 | 11/2011 |
| EP | 2378703 | 10/2011 |
| JP | 2015-501586 | 1/2015 |
| KR | 1020110059529 | 6/2011 |
| KR | 1020110090784 | 8/2011 |
| WO | 2010/053984 | 5/2010 |
| WO | 2011/095062 | 8/2011 |
| WO | 11/128013 | 10/2011 |
| WO | 2013/058624 | 4/2013 |

OTHER PUBLICATIONS

European Patent Office Application Serial No. 12847335.2, Search Report dated Jul. 22, 2015, 9 pages.
PCT International Application No. PCT/KR2012/009544, Written Opinion of the International Searching Authority, dated Jan. 31, 2013, 16 pages.
NH Docomo, "DM-RS Design for E-PDCCH in Rel-11," 3GPP TSG RAN WG1 Meeting #67, R1-114302, Nov. 2011, 5 pages.
NH Docomo, "Mapping Design for E-PDCCH in Rel-11," 3GPP TSG RAN WG1 Meeting #67, R1-114081, Nov. 2011, 7 pages.
Texas Instruments, "On reference signals for enhanced downlink control channel," 3GPP TSG RAN WG1 Meeting #67, R1-113791, Nov. 2011, 5 pages.
Samsung, "DM-RS based Distributed and Localized E-PDCCH structure," 3GPP TSG RAN WG1 #67, R1-114239, Nov. 2011, 4 pages.
LG Electronics, "Clarification of PRB Bundling in Un Link," 3GPP TSG RAN WG1 #63bis, R1-110378, Jan. 2011, 3 pages.
State Intellectual Property Office of the People's Republic of China Application Serial No. 201280066121.5, Office Action dated Jul. 25, 2016, 12 pages.
Alcatel-Lucent Shanghai Bell, et al., "Multiplexing of Localized and Distributed ePDCCH in Same PRBs", R1-122499, 3GPP TSG RAN WG1 Meeting #69, May 2012, 3 pages.
Texas Instruments, "Antenna port configuration for ePDCCH transmissions", R1-122738, 3GPP TSG RAN WG1 #69, May 2012, 2 pages.
LG Electronics, "Discussions on the association between antenna ports and ePDCCH", R1-122304, 3GPP TSG RAN WG1 Meeting #69, May 2012, 6 pages.
Texas Instruments, "Need for localized and distributed ePDCCH candidates in one sub-frame", R1-122744, 3GPP TSG RAN WG1 #69, May 2012, 3 pages.
Intellectual Property Office of India Application No. 4210/CHENP/2014, Office Action dated Apr. 6, 2018, 8 pages.

\* cited by examiner

FIG. 6
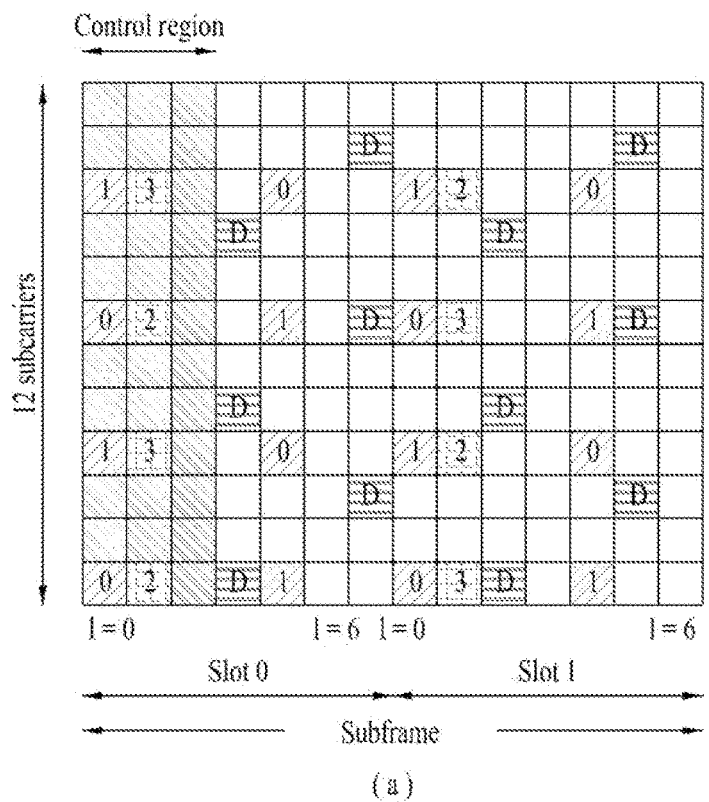
(a)
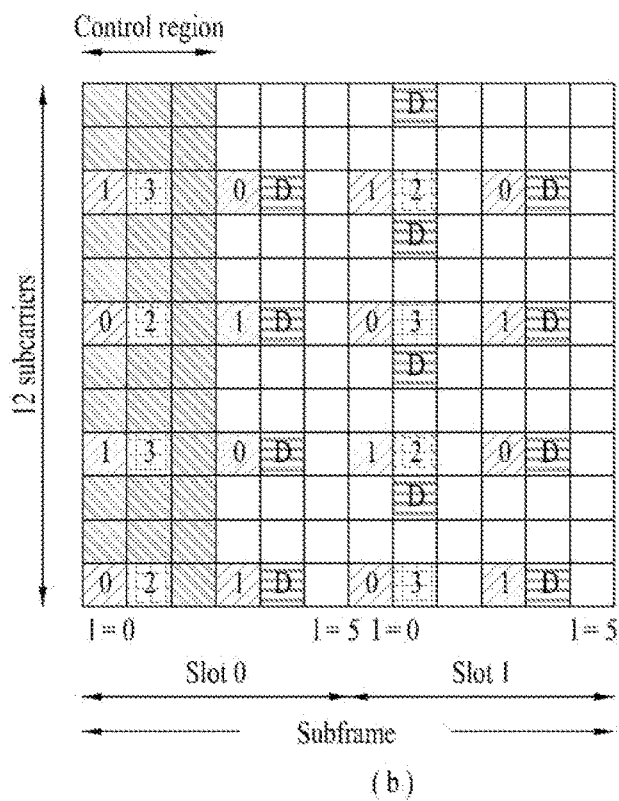
(b)

FIG. 9
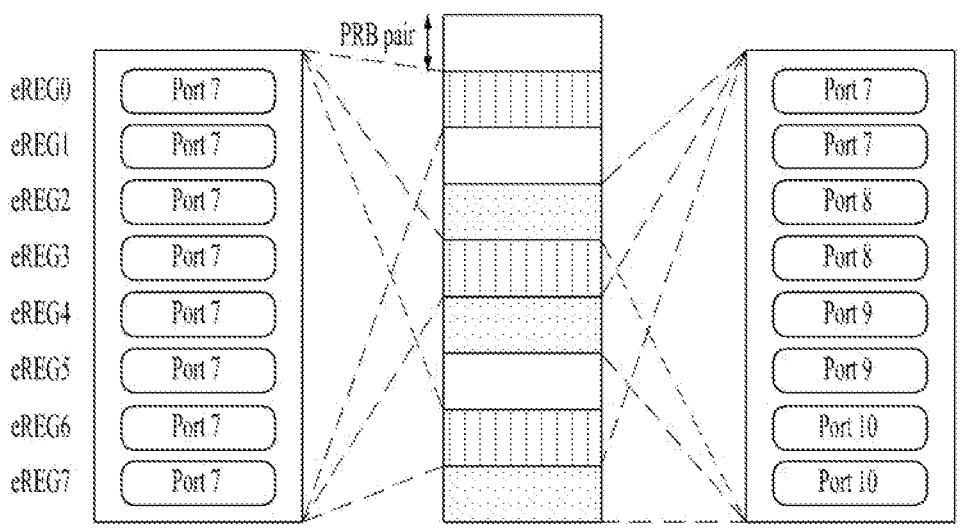
(a)
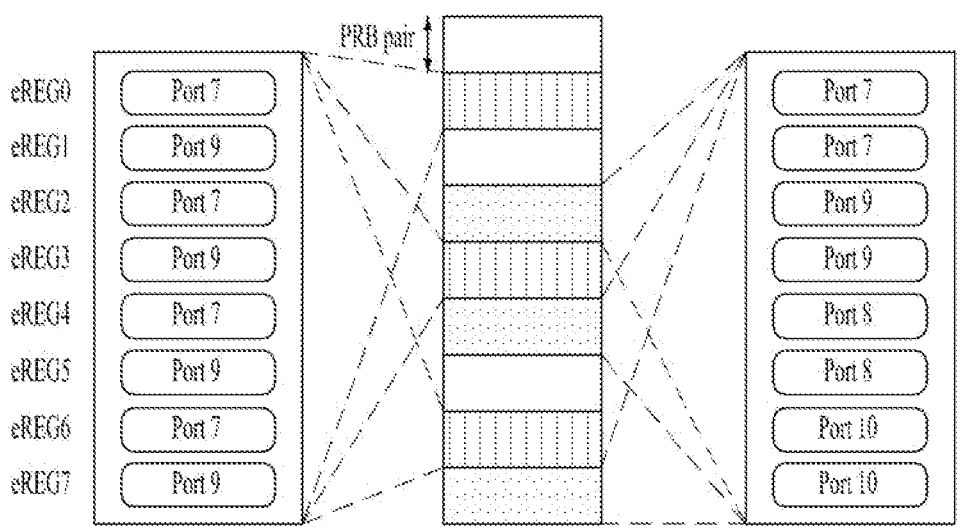
(b)
▢ : PRB pairs for distributed transmission         ▦ : PRB pairs for localized transmission

FIG. 10
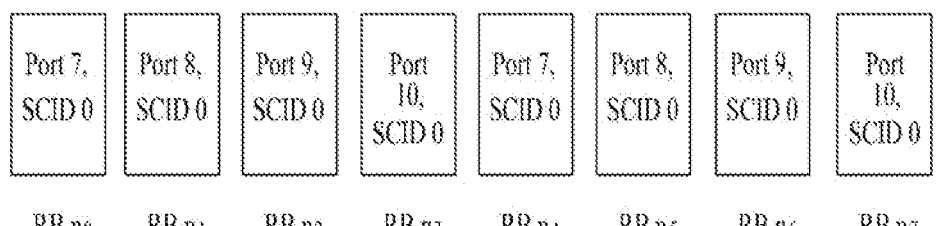
(a)
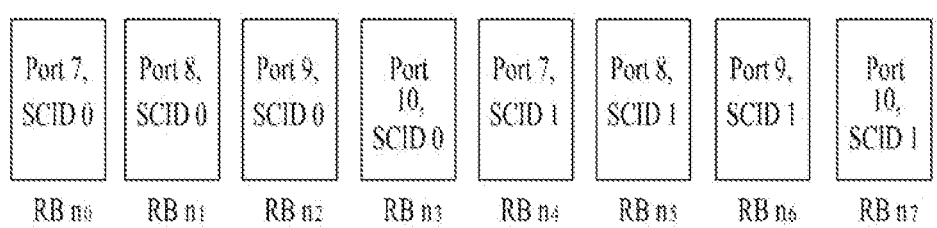
(b)
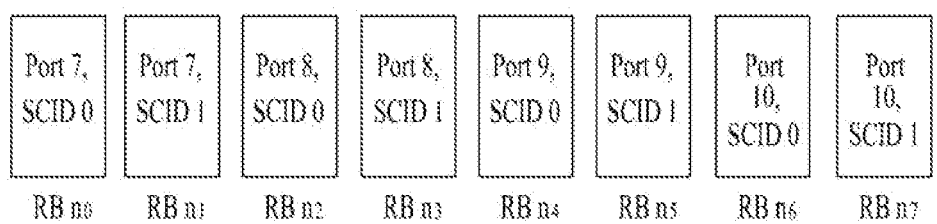
(c)
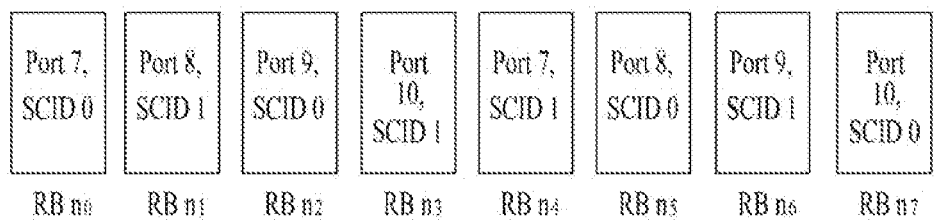
(d)

FIG. 11

|  | RB n0 | RB n1 | RB n2 | RB n3 | RB n4 | RB n5 | RB n6 | RB n7 |
|---|---|---|---|---|---|---|---|---|
| UE 1 | Port 7 | Port 8 | Port 7 | Port 8 | Port 7 | Port 8 | Port 7 | Port 8 |
| UE 2 | Port 7 | Port 7 | Port 8 | Port 8 | Port 7 | Port 7 | Port 8 | Port 8 |
| UE 3 | Port 8 | Port 8 | Port 8 | Port 8 | Port 7 | Port 7 | Port 7 | Port 7 |
| MU-MIMO paring | (1 or 2) and 3 | 2 and (3 or 1) | 1 and (2 or 3) | No | No | 1 and (2 or 3) | 2 and (3 or 1) | (1 or 2) and 3 |

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/009544, filed on Nov. 13, 2012, which claims the benefit of U.S. Provisional Application Nos. 61/559,139, filed on Nov. 13, 2011, 61/598,302, filed on Feb. 13, 2012, 61/650,480, filed on May 23, 2012, and 61/661,331, filed on Jun. 18, 2012, the contents of which are all hereby incorporated by reference herein their entirety.

TECHNICAL FIELD

The present invention relates to a wireless communication system and, more particularly, to a method and apparatus for transmitting an enhanced physical downlink channel (E-PDCCH) and a demodulation reference signal (DMRS) for the E-PDCCH.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, and a multi-carrier frequency division multiple access (MC-FDMA) system.

DISCLOSURE

Technical Problem

The present invention discloses embodiments associated with the relationship between a DMRS parameter and a resource, during E-PDCCH transmission and DMRS transmission for an E-PDCCH, in transmitting control information.

The technical objects that can be achieved through the present invention are not limited to what has been particularly described hereinabove and other technical objects not described herein will be more clearly understood by persons skilled in the art from the following detailed description.

Technical Solution

In a first technical aspect of the present invention, provided herein is a method for transmitting control information by a base station in a wireless communication system, the method including transmitting an enhanced physical downlink channel (E-PDCCH) to a user equipment, using at least one or more physical resource block (PRB) pairs among a plurality of PRB pairs for E-PDCCH transmission, wherein the plurality of PRB pairs include one or more PRB pair sets, and wherein a parameter associated with a demodulation reference signal for the E-PDCCH is configured with respect to each of the one or more PRB pair sets.

In a second aspect of the present invention, provided herein is a base station in a wireless communication system, the base station including a transmission module and a processor, wherein the processor transmits an enhanced physical downlink channel (E-PDCCH) to a user equipment, using at least one or more physical resource block (PRB) pairs among a plurality of PRB pairs for E-PDCCH transmission, wherein the plurality of PRB pairs include one or more PRB pair sets, and wherein a parameter associated with a demodulation reference signal for the E-PDCCH is configured with respect to each of the one or more PRB pair sets.

The first and second technical aspects of the present invention may include the followings.

The one or more PRB pair sets may include one or more sets among one or more PRB pair sets for localized transmission and one or more PRB pair sets for distributed transmission. The parameter may be a parameter for determining an initial value of a scrambling sequence needed to generate the demodulation reference signal. Information regarding the initial vale of the scrambling sequence may be transmitted to the user equipment through higher layer signaling.

The parameter may be a plurality of antenna ports. Information regarding the plural antenna ports is transmitted to the user equipment through higher layer signaling.

The plurality of PRB pairs may include four minimum resource units for E-PDCCH transmission. The antenna ports may be respectively associated with minimum resource units for E-PDCCH transmission.

When resources available for the E-PDCCH in the physical resource pairs decreases, only partial antenna ports among preset antenna ports for the PRB pairs may be used.

Advantageous Effects

According to the present invention, transmission of control information can be efficiently supported by defining the relationship between a DMRS parameter and a resource.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

FIG. 6 is a view explaining reference signals.

FIGS. 9 to 14 are view explaining the relationship between demodulation reference signal parameters and resources according to embodiments of the present invention.

BEST MODE FOR CARRYING OUT THE INVENTION

Figure 1:
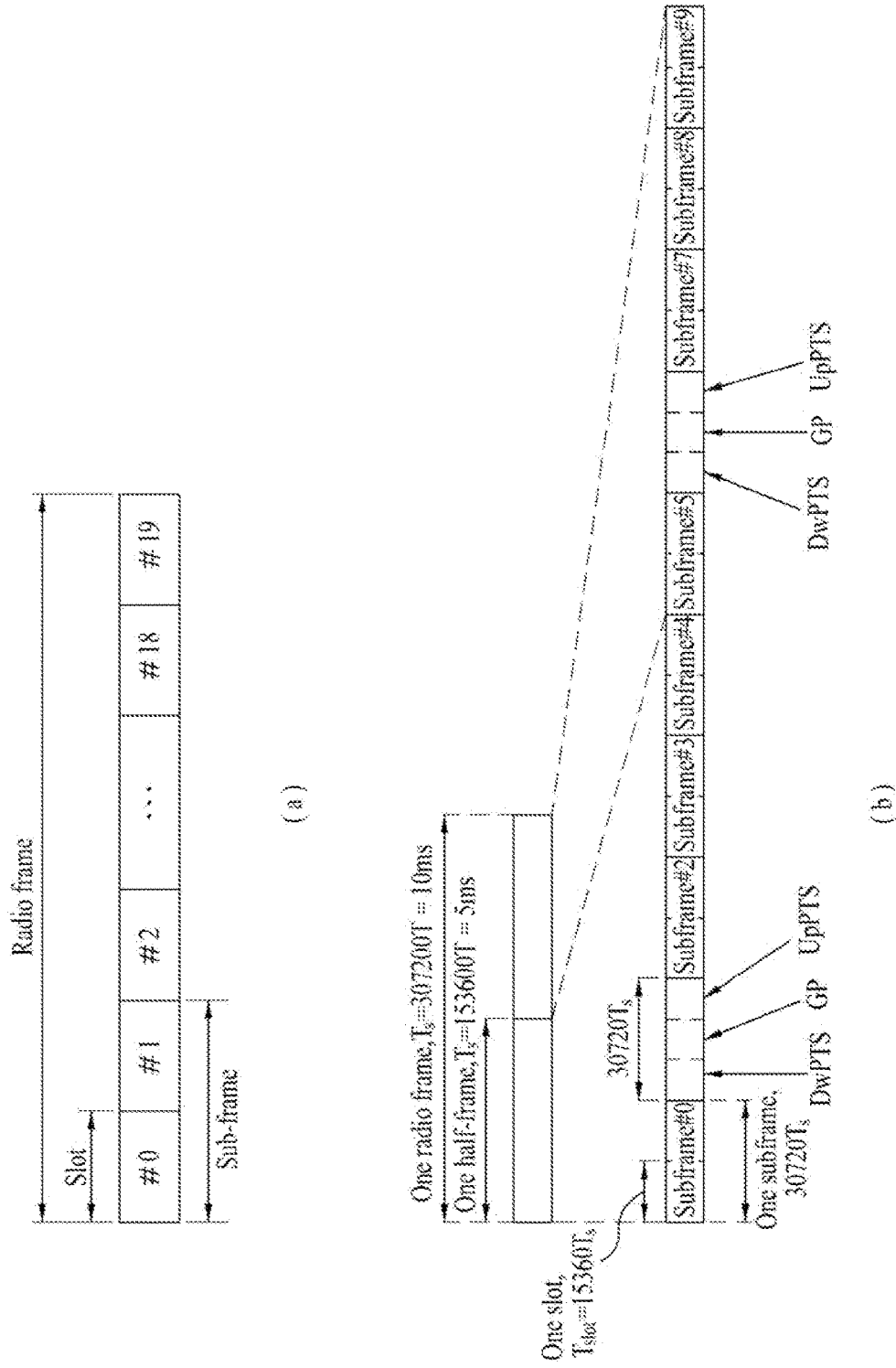
FIG. 1 is a view illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the present disclosure, the embodiments of the present invention are described based on a data transmission and reception relationship between a base station (BS) and a terminal. The BS is a terminal node of a network, which directly communicates with the terminal. A specific operation described as performed by the BS may be performed by an upper node of the BS.

In other words, it is apparent that, in a network comprised of a plurality of network nodes including a BS, various operations performed for communication with a terminal may be performed by the BS, or network nodes other than the BS. The term BS may be replaced with the terms fixed station, Node B, evolved Node B (eNode B or eNB), access point (AP), transmission point, etc. The term relay is used interchangeably with relay node (RN), relay station (RS), etc. The term terminal may be replaced with the terms user equipment (UE), mobile station (MS), mobile subscriber station (MSS), subscriber station (SS), etc.

Specific terms used in the following description are provided to aid in understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

The embodiments of the present invention can be supported by standard documents disclosed for at least one of wireless access systems such as the institute of electrical and electronics engineers (IEEE) 802, $3^{rd}$ generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by a radio technology such as universal terrestrial radio access (UTRA) or CDMA2000. TDMA may be implemented by a radio technology such as global system for mobile communications (GSM)/general packet radio service (GPRS)/enhanced data rates for GSM evolution (EDGE). OFDMA may be implemented by a radio technology such as IEEE 802.11 (Wi-Fi), IEEE 802.16 (WiMAX), IEEE 802.20, evolved-UTRA (E-UTRA), etc. UTRA is a part of universal mobile telecommunication system (UMTS). 3GPP LTE is a part of evolved-UMTS (E-UMTS) using E-UTRA. 3GPP LTE employs OFDMA for downlink and SC-FDMA for uplink. LTE-A is an evolution of 3GPP LTE. WiMAX can be explained by the IEEE 802.16e specification (wireless metropolitan area network (WirelessMAN)-OFDMA reference system) and the IEEE 802.16m specification (WirelessMAN-OFDMA advanced system). For clarity, the present disclosure focuses on 3GPP LTE and LTE-A systems. However, the technical features of the present invention are not limited thereto.

The structure of a radio frame will now be described with reference to FIG. 1.

In a cellular orthogonal frequency division multiplexing (OFDM) wireless packet communication system, uplink (UL)/downlink (DL) data packets are transmitted in units of subframes. One subframe is defined as a predetermined time period including a plurality of OFDM symbols. 3GPP LTE supports the structure of a type 1 radio frame applicable to frequency division duplex (FDD) and the structure of a type 2 radio frame applicable to time division duplex (TDD).

FIG. 1(a) is a diagram illustrating the structure of the type 1 radio frame. A DL radio frame is divided into 10 subframes each including two slots in the time domain. A time during which one subframe is transmitted is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since the 3GPP LTE system uses OFDMA on DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when a UE moves fast, the extended CP may be used in order to further reduce inter-symbol interference.

In the case of the normal CP, since one slot includes 7 OFDM symbols, one subframe includes 14 OFDM symbols. The first two or three OFDM symbols of each subframe may be allocated to a physical downlink control channel (PDCCH) and the remaining OFDM symbols may be allocated to a physical downlink shared channel (PDSCH).

FIG. 1(b) illustrates the structure of the type 2 radio frame. The type 2 radio frame includes two half frames, each half frame including 5 subframes, a DL pilot time slot (DwPTS), a guard period (GP), and a UL pilot time slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal. One subframe includes two slots irrespective of the type of a radio frame.

The structures of radio frames are only exemplary. Accordingly, the number of subframes in a radio frame, the number of slots in a subframe, and the number of symbols in a slot may be changed in various manners.

Figure 2:
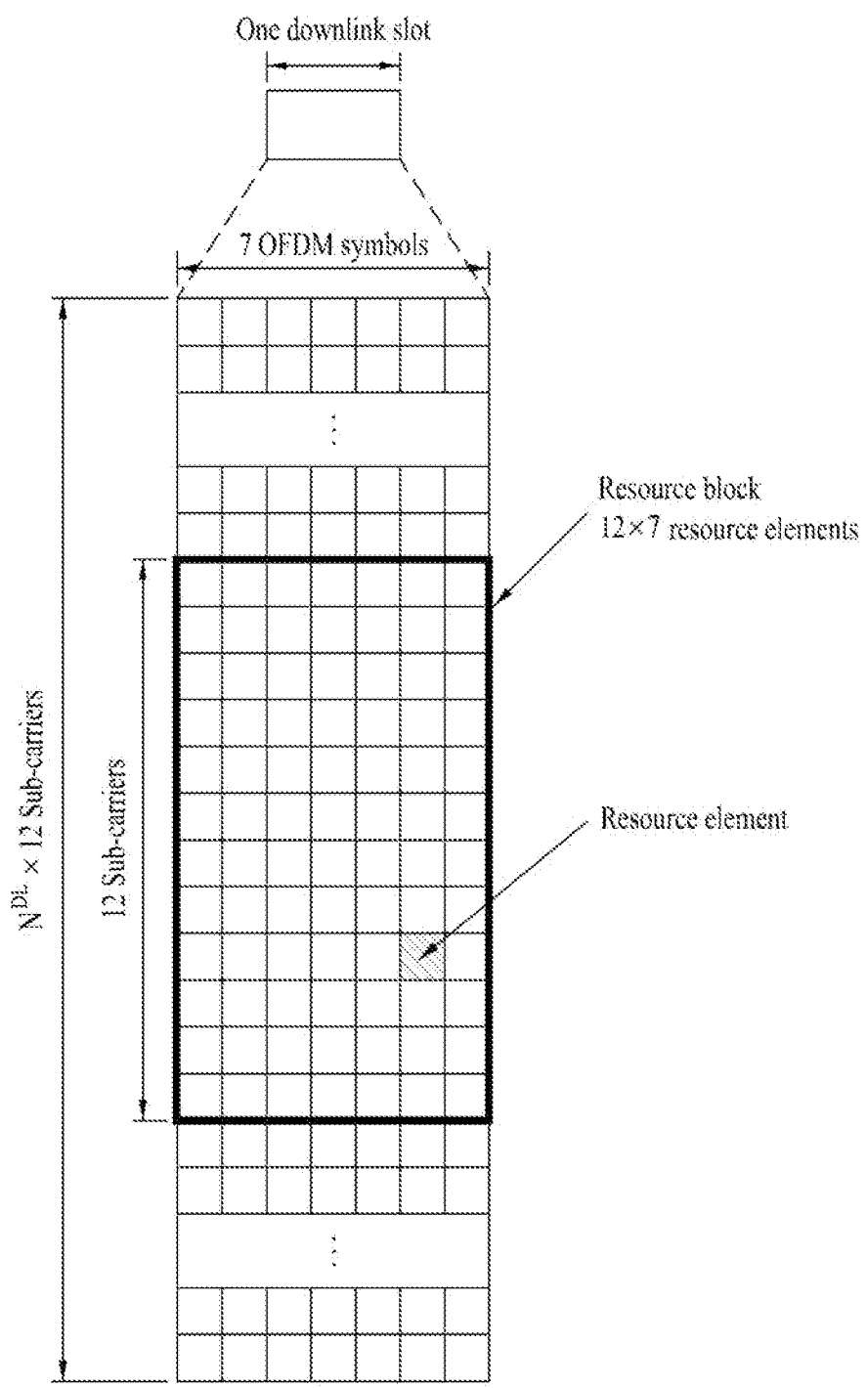
FIG. 2 is a view illustrating a resource grid in a downlink slot.

FIG. 2 illustrates a resource grid in a DL slot. A DL slot has 7 OFDM symbols in the time domain and an RB includes 12 subcarriers in the frequency domain, which does not limit the present invention. For example, a DL slot includes 7 OFDM symbols in a subframe with normal CPs, whereas a DL slot includes 6 OFDM symbols in a subframe with extended CPs. Each element of the resource grid is referred to as a resource element (RE). An RB includes 12×7 REs. The number of RBs in a DL slot, $N^{DL}$, depends on a DL transmission bandwidth. A UL slot may have the same structure as a DL slot.

Figure 3:
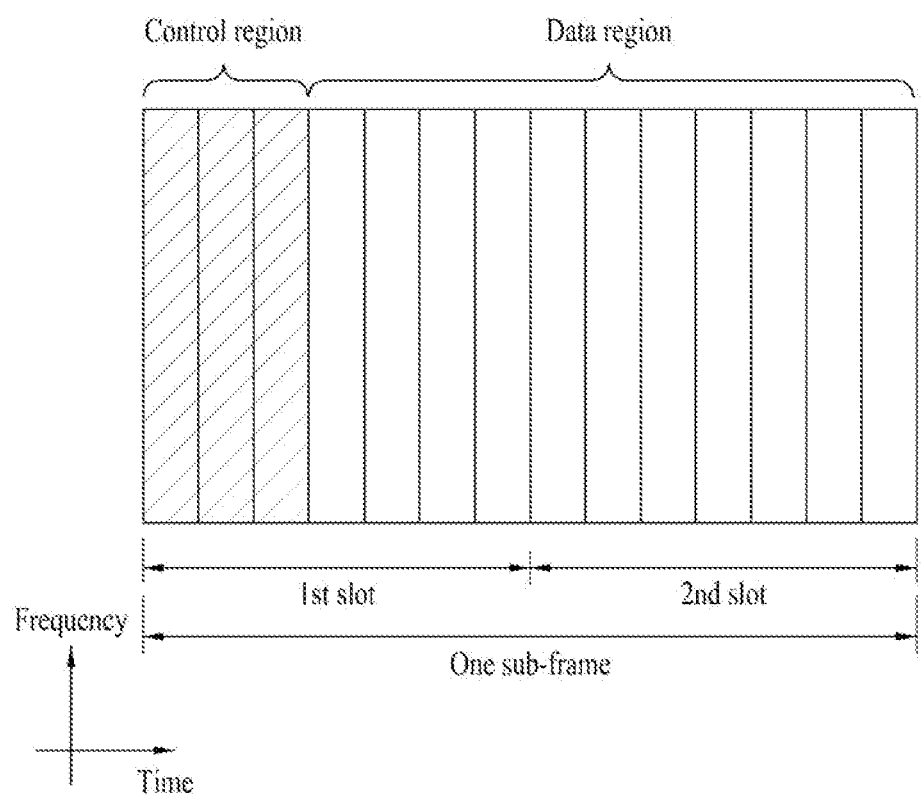
FIG. 3 is a view illustrating the structure of a downlink subframe.

FIG. 3 is a diagram illustrating the structure of a DL subframe. Up to three OFDM symbols at the start of the first slot of a DL subframe are used as a control region to which control channels are allocated and the other OFDM symbols of the DL subframe are used as a data region to which a PDSCH is allocated. DL control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal as a response to a UL transmission. Control information carried on the PDCCH is called downlink control information (DCI). The DCI includes UL scheduling information, DL scheduling information, or UL transmit power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of resource element groups. The format of a PDCCH and the number of available bits for the PDCCH are determined according to the relationship between the number of CCEs and a coding rate provided by the CCEs. An eNB determines a PDCCH format according to DCI transmitted to a UE and adds a cyclic redundancy check (CRC) to control information. The CRC is masked by an identifier (ID) known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC thereof may be masked by a paging indicator identifier (P-RNTI). If the PDCCH carries system information (more particularly, a system information block (SIB), the CRC thereof may be masked by a system information ID and a system information RNTI (SI-RNTI). To indicate that the PDCCH carries a random access response to a random access preamble transmitted by a UE, the CRC thereof may be masked by a random access-RNTI (RA-RNTI).

Figure 4:
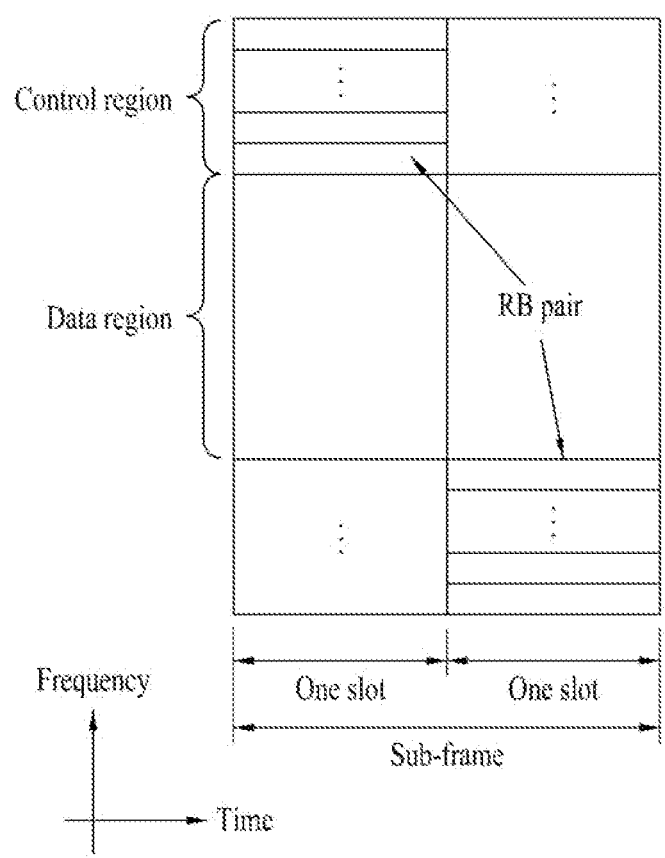
FIG. 4 is a view illustrating the structure of an uplink subframe.

FIG. 4 is a diagram illustrating the structure of a UL subframe. The UL subframe is divided into a control region and a data region in the frequency domain. A physical uplink control channel (PUCCH) including uplink control information (UCI) is allocated to the control region and a physical uplink shared channel (PUSCH) including user data is allocated to the data region. To maintain single-carrier properties, a UE does not transmit a PUSCH and a PUCCH simultaneously. A PUCCH for one UE is allocated to an RB pair in a subframe. The RBs belonging to the RB pair occupy different subcarriers in two slots. Thus it is said that the RB pair allocated to the PUCCH is frequency-hopped over a slot boundary.

DCI Formats

Current LTE-A (release 10) defines DCI formats 0, 1, 1A, 1B, 1C, 1D, 2, 2A, 2B, 2C, 3, 3A, and 4. DCI formats 0, 1A, 3, and 3A have the same message size to reduce the number of blind decoding procedures as described later. According to the usages of control information transmitted in these DCI formats, the DCI formats are classified into i) DCI formats 0 and 4 used for a UL grant, ii) DCI formats 1, 1A, 1B, 1C, 1D, 2, 2A, 2B, and 2C used for DL scheduling assignment, and iii) DCI formats 3 and 3A used for transmit power control (TPC) commands DCI format 0 used for transmission of a UL grant may include a carrier indicator required for later-described carrier aggregation, an offset that differentiates DCI format 0 from DCI format 1A (flag for format 0/format 1A differentiation), a frequency hopping flag indicating whether frequency hopping applies to UL PUSCH transmission, resource block assignment information about allocation of RBs to PUSCH transmission of a UE, a modulation and coding scheme (MCS), a new data indicator used to empty a buffer for initial transmission in relation to a HARQ process, a TPC command for a scheduled PUSCH, cyclic shift for a DMRS and an orthogonal code cover, a UL index required for time division duplexing (TDD) operation, and channel quality indicator (CQI) request (or channel state information (CSI) request) information. Because DCI format 0 uses synchronous HARQ, DCI format 0 does not include a redundancy version, compared to the DCI formats related to DL scheduling assignment. If cross carrier scheduling is not used, the carrier indicator is not included in the DCI format.

DCI format 4 has been newly added to LTE-A release 10, with the aim to support spatial multiplexing for UL transmission. Compared to DCI format 0, DCI format 4 further includes spatial multiplexing information, thus having a relatively large message size. In addition to control information included in DCI format 0, DCI format 4 further includes other control information. That is, DCI format 4 further includes an MCS for a second transport block, precoding information for multiple input multiple output (MIMO) transmission, and sounding reference signal (SRS) request information. Because DCI format 4 is greater than DCI format 0 in size, DCI format 4 does not include the flag for format 0/format 1A differentiation.

Among DCI formats 1, 1A, 1B, 1C, 1D, 2, 2A, 2B, and 2C related to DL scheduling assignment, DCI formats 1, 1A, 1B, 1C, and 2C do not support spatial multiplexing, whereas DCI formats 2, 2A, 2B, and 2C support spatial multiplexing.

DCI format 1C supports only contiguous frequency allocation as a compact DL assignment. Compared to other DCI formats, DCI format 1C does not include the carrier offset and the redundancy version.

DCI format 1A is used for DL scheduling and a random access procedure. DCI format 1A may include a carrier indicator, an indicator indicating whether distributed DL transmission is used, PDSCH resource allocation information, an MCS, a redundancy version, a HARQ process number indicating a processor used for soft combining, a new data indicator used to empty a buffer for initial transmission in relation to a HARQ process, a TPC command for a PUCCH, a UL index required for TDD operation, etc.

Control information of DCI format 1 is mostly similar to control information of DCI format 1A except that DCI format 1A is related to contiguous resource allocation and DCI format 1 supports non-contiguous resource allocation. Accordingly, DCI format 1 further includes a resource allocation header, thereby increasing control signaling overhead as a trade-off of an increase in resource allocation flexibility.

DCI formats 1B and 1D are common in that they further include precoding information, compared to DCI format 1. DCI format 1B includes precoding matrix index (PMI) confirmation and DCI format 1D carries DL power offset information. Other control information included in DCI formats 1B and 1D is mostly identical to control information of DCI format 1A.

DCI formats 2, 2A, 2B, and 2C basically include most of the control information included in DCI format 1A and further include spatial multiplexing information. The spatial multiplexing information includes an MCS for a second transport block, a new data indicator, and a redundancy version.

DCI format 2 supports closed-loop spatial multiplexing and DCI format 2A supports open-loop spatial multiplexing. Both DCI formats 2 and 2A include precoding information. DCI format 2B supports dual-layer spatial multiplexing combined with beamforming and further includes cyclic shift information for a DMRS. DCI format 2C is an extension of DCI format 2B, supporting spatial multiplexing of up to 8 layers.

DCI formats 3 and 3A may be used to support TPC information included in the DCI formats used for transmission of a UL grant and DL scheduling assignment, that is, to support semi-persistent scheduling. A 1-bit command is used per UE in DCI format 3 and a 2-bit command is used per UE in DCI format 3A.

One of the above-described DCI formats may be transmitted on one PDCCH and a plurality of PDCCHs may be transmitted in the control region. A UE may monitor a plurality of PDCCHs.

PDCCH Processing

CCEs, which are contiguous logical allocation units, are used to map PDCCHs to REs. One CCE includes a plurality of (e.g. 9) resource element groups (REGs), each REG having four adjacent REs except for RS REs.

The number of CCEs required for a specific PDCCH depends on DCI payload indicating control information size and on cell bandwidth, a channel coding rate, etc. Specifically, the number of CCEs for a specific PDCCH may be defined according to a PDCCH format, as illustrated in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described before, one of the above four formats is used for a PDCCH, which is not known to a UE. Therefore, the UE should decode the PDCCH without knowledge of the PDCCH format. This is called blind decoding. However, because decoding of all possible DL CCEs for each PDCCH format may impose a great constraint on the UE, a search space is defined in consideration of scheduler restrictions and the number of decoding attempts.

Namely, a search space is a set of candidate PDCCHs formed by CCEs that the UE is supposed to attempt to decode at a given aggregation level. Aggregation levels and the number of PDCCH candidates may be defined as follows.

TABLE 2

| Search space | Aggregation level | Size (in CCEs) | Number of PDCCH candidates |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

As noted from Table 2, there are four aggregation levels and thus the UE has a plurality of search spaces at each aggregation level. Search spaces may be classified into a UE-specific search space and a common search space. The USS is configured for specific UEs. Each of the UEs may monitor the UE-specific search space (may attempt to decode a set of PDCCH candidates according to possible DCI formats) and verify an RNTI masked with a PDCCH and a CRC of the PDCCH. If the RNTI and CRC are valid, the UE may acquire control information.

The common search space is designed for the case in which a plurality of UEs or all UEs need to receive a PDCCH for dynamic scheduling of system information or a paging message. Nonetheless, the common search space may be used for a specific UE depending on resource management. The common search space may overlap with the UE-specific search space.

A search space may be determined by Equation 1.

$$L\{(Y_k+m')\bmod[N_{CCE,k}/L]\}+i \qquad \text{[Equation 3]}$$

where L is an aggregation level, $Y_k$ is a variable determined by an RNTI and subframe number k, and m' is the number of PDCCH candidates. If carrier aggregation is used, $m'=m+M^{(L)} \cdot n_{CI}$ and otherwise, $m'=m$. Here, $m=0, \ldots, M^{(L)}-1$ where $M^{(L)}$ is the number of PDCCH candidates. $N_{CCE,k}$ is the total number of CCEs in the control region of a k-th subframe and i indicates an individual CCE in a PDCCH candidate ($i=0, \ldots, L-1$). In the common search space, $Y_k$ is always 0.

Figure 5:
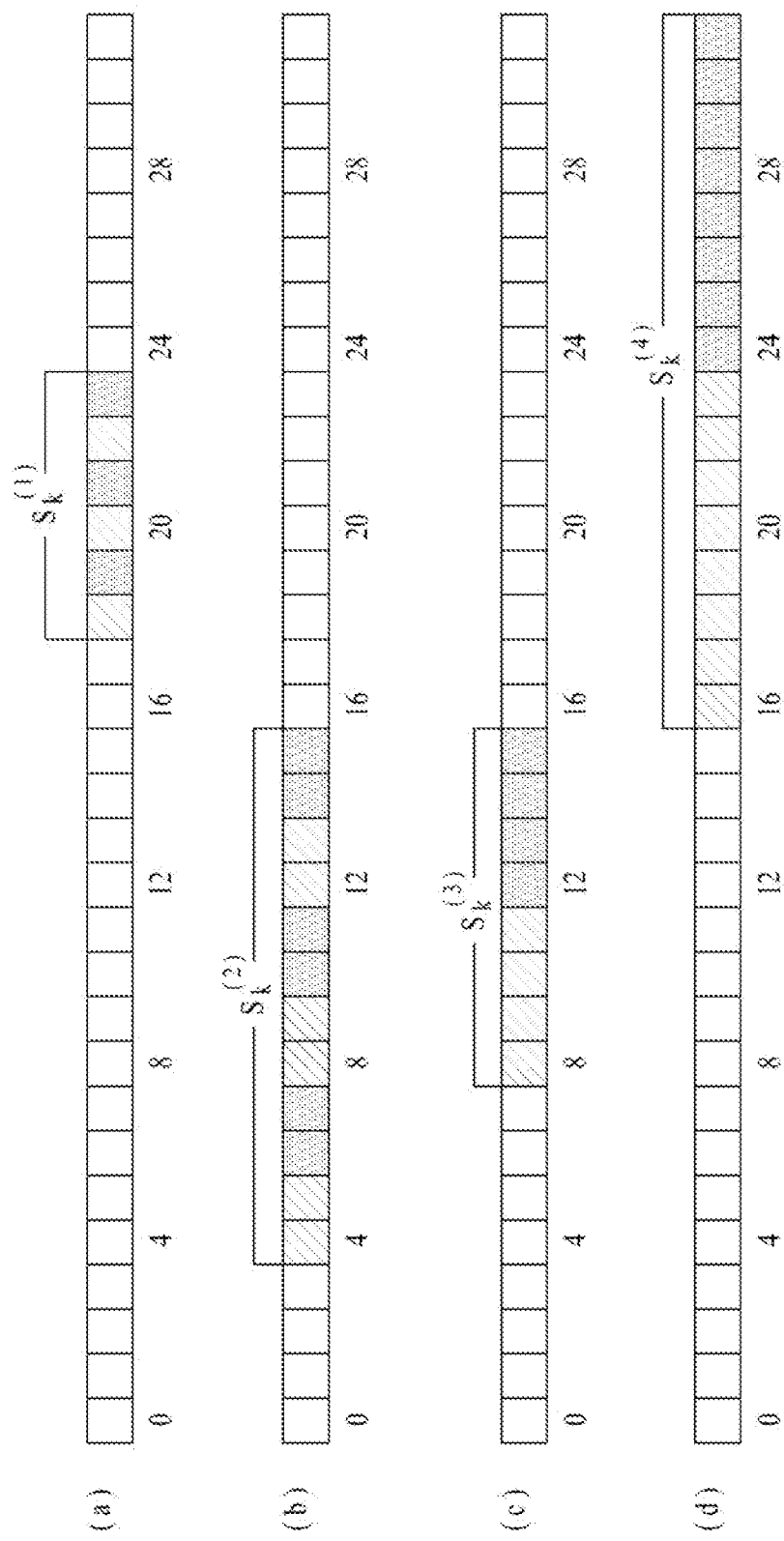
FIG. 5 is a view explaining a search space.

FIG. 5 illustrates a UE-specific search space (shaded) at each aggregation level, as defined by Equation 1. Here, carrier aggregation is not adopted and $N_{CCE,k}$ is set to 32, for convenience of description.

FIGS. 5(*a*), 5(*b*), 5(*c*), and 5(*d*) illustrate UE-specific search spaces at aggregation levels 1, 2, 4, and 8, respectively. In FIG. 5, numbers indicate CCE numbers. As described before, the start CCE of a search space at each aggregation level is determined by an RNTI and subframe number k. For a UE, the start CCE of a search space may be different in the same subframe according to an aggregation level due to a modulo function and L. In addition, the start CCE of a search space is always a multiple of an aggregation level due to L. By way of example, $Y_k$ is CCE 18. The UE attempts to sequentially decode CCEs in units of CCEs determined by an aggregation level, starting from the start CCE. For example, (b) of FIG. 5, the UE attempts to decode CCEs in units of two CCEs according to an aggregation level, starting from CCE 4 which is the start CCE.

As described above, the UE attempts to perform decoding in a search space. The number of decoding procedures is determined by a DCI format and a transmission mode indicated by radio resource control (RRC) signaling. If carrier aggregation is not used, the UE needs to attempt a maximum of 12 decoding procedures in a common search space, in consideration of two DCI sizes (DCI format 0/1A/3/3A and DCI format 1C) for each of six PDCCH candidates. In a UE-specific search space, the UE needs to attempt a maximum of 32 decoding procedures, in consideration of two DCI sizes for each of 16 PDCCH candidates (6+6+2+2=16).

Meanwhile, if carrier aggregation is used, the maximum number of decoding procedures is further increased because as many decoding procedures as the number of DL resources (component carriers) are added for a UE-specific search space and DCI format 4.

Reference Signal (RS)

In a wireless communication system, a packet is transmitted through a radio channel and thus the packet may be distorted during transmission. To receive a signal successfully, a receiver should compensate for the distortion of the received signal using channel information. To obtain the channel information, a transmitter transmits a signal known to both the transmitter the receiver and the receiver acquires the channel information based on the distortion of the signal received through the radio channel. This signal is called a pilot signal or an RS.

In the case of data transmission and reception using multiple antennas, a channel states between transmit antennas and receive antennas should be discerned in order to correctly receive a signal. Accordingly, an RS should be transmitted through each transmit antenna, more specifically, each antenna port.

RSs may be divided into UL RSs and DL RSs. In the current LTE system, the UL RSs include:

i) Demodulation reference signal (DMRS) used for channel estimation for coherent demodulation of information transmitted through a PUSCH and a PUCCH; and ii) Sounding reference signal (SRS) used for an eNB or a network to measure the quality of a UL channel in a different frequency.

The DL RSs include:

i) Cell-specific reference signal (CRS) shared among all UEs in a cell;

ii) UE-specific RS dedicated to a specific UE;

iii) DM-RS used for coherent demodulation when a PDSCH is transmitted;

iv) Channel State Information-Reference Signal (CSI-RS) used for transmitting CSI, when DL DM-RSs are transmitted;

v) Multimedia broadcast single frequency network (MB-SFN) RS used for coherent demodulation of a signal transmitted in MBSFN mode; and vi) Positioning RS used to estimate geographical position information of a UE.

RSs may be divided into two types according to purposes thereof: RSs for channel information acquisition and RSs for data demodulation. Since the purpose of the former is to cause the UE to acquire DCI, the RSs for channel information acquisition should be transmitted in a broad band and a UE that does not receive DL data in a specific subframe should receive the RSs. The RSs for channel information acquisition are also used in a situation such as handover. The RSs for data demodulation are RSs that are transmitted by an eNB to a corresponding resource together with DL data. A UE can demodulate the data by measuring a channel using the RSs for data demodulation. The RSs for data demodulation should be transmitted in a data transmission area.

The CRS is used for two purposes, that is, channel information acquisition and data demodulation. The UE-specific RS is used only for data demodulation. The CRS is transmitted in every subframe in a broad band and CRSs for up to four antenna ports are transmitted according to the number of transmit antennas of an eNB.

For example, if the number of transmit antennas of an eNB is 2, CRSs for antenna ports 0 and 1 are transmitted. In the case of four transmit antennas, CRSs for antenna ports 0 to 3 are respectively transmitted.

FIG. 6 illustrates patterns in which CRSs and DRSs are mapped to a DL RB pair, as defined in a legacy 3GPP LTE system (e.g. a Release-8 system). A DL RB pair as an RS mapping unit may be expressed as one subframe in time by 12 subcarriers in frequency. That is, an RB pair includes 14 OFDM symbols in the time domain in the case of the normal CP (see FIGS. 5(*a*) and 12 OFDM symbols in the time domain in the case of the extended CP (FIG. 6(*b*).

FIG. 6 illustrates the positions of RSs on an RB pair in a system where an eNB supports four transmit antennas. In FIG. 5, REs expressed by reference numerals '0', '1', '2', and '3' illustrates the positions of CRSs for antenna ports 0, 1, 2, and 3, respectively, and REs expressed by 'D' denote the positions of DRSs.

Demodulation Reference Signal (DMRS)

A DMRS is an RS defined for the purpose of causing a UE to perform channel estimation for a PDSCH. The DMRS may be used in transmission ports 7, 8, and 9. Initially, the DMRS has been defined for a single layer of antenna port 5 and, thereafter, the use of the DMRS has been extended for spatial multiplexing of a maximum of 8 layers. As can be appreciated from its other name UE-specific RS, the DMRS is transmitted only for one specific UE. Therefore, the DMRS may be transmitted only in an RB in which a PDSCH for the specific UE is transmitted.

Figure 7:
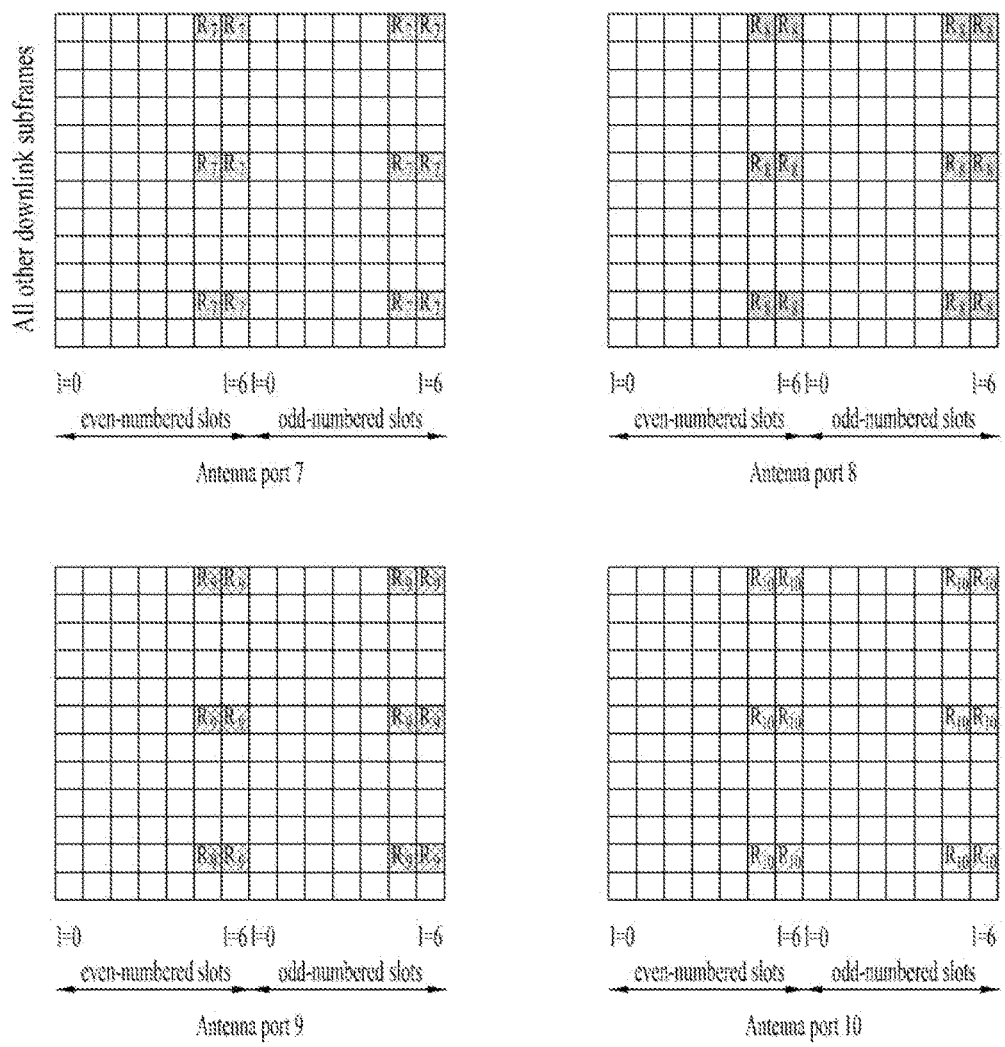
FIGS. 7 and 8 are views explaining demodulation reference signals.

The DMRS for up to 8 layers are generated as follows. The DMRS may be transmitted by mapping a reference-signal sequence r(m) generated by Equation 5 to complex-valued modulation symbols $a_{k,l}^{(p)}$ according to Equation 6. FIG. 7 illustrates antenna ports 7 to 10 as a result of mapping the DMRS to a resource grid on a subframe in the case of a normal CP according to Equation 5.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 5]}$$

-continued $$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

where r(m) denotes an RS sequence, c(i) denotes a pseudo random sequence, and $N_{RB}^{max,DL}$ denotes the maximum number of RBs of DL bandwidth.

$$a_{k,l}^{(p)} = w_p(l') \cdot r(3 \cdot l' \cdot N_{RB}^{max,DL} + 3 \cdot n_{PRB} + m') \quad \text{[Equation 6]}$$

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{for special subframe configurations 3, 4, 8, and 9} \\ l' \bmod 2 + 2 + 3\lfloor l'/2 \rfloor & \text{for special subframe configurations 1, 2, 6, and 7} \\ l' \bmod 2 + 5 & \text{for non-special subframes} \end{cases}$$

$$l' = \begin{cases} 0, 1, 2, 3 & \text{for } n_s \bmod 2 = 0 \text{ and special subframe configurations 1, 2, 6, and 7} \\ 0, 1 & \text{for } n_s \bmod 2 = 0 \text{ and special subframe configurations } \textit{orther} \text{ than 1, 2, 6, and 7} \\ 2, 3 & \text{for } n_s \bmod 2 = 1 \text{ and special subframe configurations } \textit{orther} \text{ than 1, 2, 6, and 7} \end{cases}$$

$$m' = 0, 1, 2$$

As can be seen from Equation 6, an orthogonal sequence $\overline{w}_p(i)$ as illustrated in Table 5 is applied to the RS sequence according to an antenna port during mapping to a complex modulation symbol.

TABLE 5

| Antenna port $p$ | $[\overline{w}_p(0) \; \overline{w}_p(1) \; \overline{w}_p(2) \; \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

A UE may perform channel estimation using a DMRS by a different method according to a spreading factor (2 or 4). Referring to Table 5, since orthogonal sequences are repeated in the form of [a b a b] in antenna ports 7 to 10, a spreading factor is 2 and, in antenna ports 11 to 14, the spreading factor is 4. If the spreading factor is 2, the UE may perform channel estimation through time interpolation after despreading a DMRS of the first slot and a DMRS of a second slot to spreading factor 2. When the spreading factor is 4, the UE may perform channel estimation by simultaneously despreading DMRSs in an entire subframe to spreading factor 4.

The above-described channel estimation according to the spreading factor can obtain gain caused by application of time interpolation in high mobility and obtain gain in a decoding time caused by the possibility of despreading to a DMRS of the first slot, when the spreading factor is 2. In addition, when the spreading factor is 4, more UEs or ranks can be supported.

Figure 8:
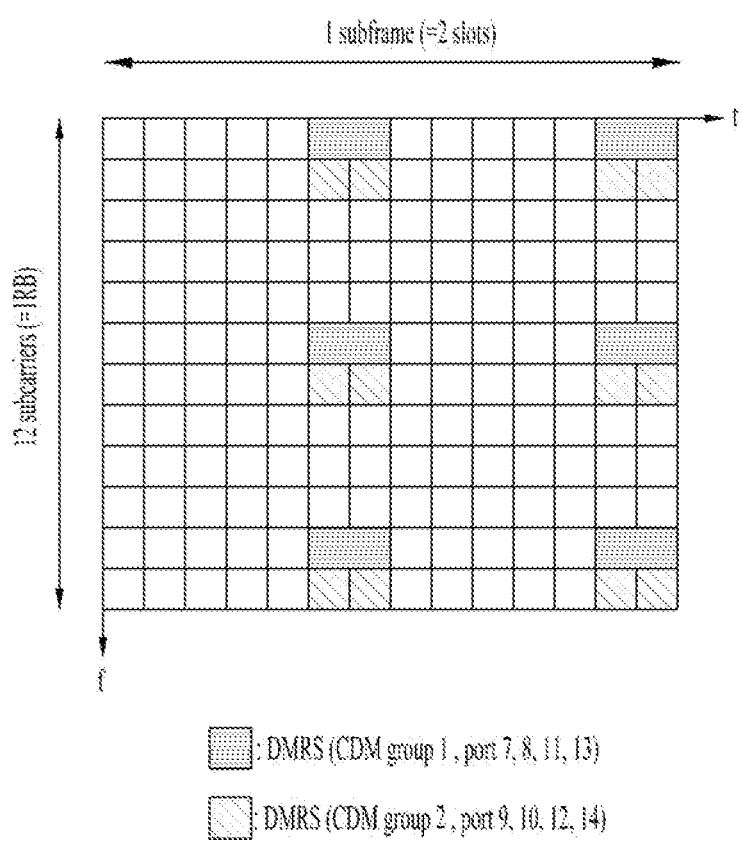

FIG. 8 will now be described in terms of DMRS overhead. FIG. 8 illustrates mapping in a subframe of DMRSs for antenna ports 7 to 14. As illustrated in FIG. 8, there are code divisional multiplexing (CDM) group 1 (or a first antenna port set) and CDM group 2 (or a second antenna port set) according to a DMRS mapping position in a resource grid. On REs corresponding to CDM group 1, DMRSs are transmitted through antenna ports 7, 8, 11, and 13 and, on REs corresponding to CDM group 2, DMRSs are transmitted through antenna ports 9, 10, 12, and 14. That is, DMRSs are transmitted on the same REs through antenna ports included in one CDM group. If DMRSs are transmitted using only antenna ports corresponding to CDM group 1, resources necessary for DMRSs are 12 REs, that is, DMRS overhead is 12 REs. Similarly, when antenna ports corresponding to CDM group 2 are used, DMRS overhead is 24 REs.

In an LTE system after Release 11, an enhanced-PDCCH (E-PDCCH) is considered as a solution to PDCCH capacity shortage caused by coordinated multi-point (CoMP) transmission and multi-user (MU)-MIMO and to PDCCH performance deterioration caused by inter-cell interference. In the E-PDCCH, DMRS based channel estimation can be performed to acquire precoding gain etc. as opposed to a conventional CRS based PDCCH.

In relation to transmission of this E-PDCCH, the present invention proposes that an antenna port and/or a scrambling sequence (or an initial value of the scrambling sequence) of a DMRS used when an eNB transmits the E-PDCCH to a specific UE be changed according to resources associated with E-PDCCH transmission (e.g. a PRB pair, a subframe, a starting enhanced CCE (eCCE) of a candidate position, an index of a subset in the PRB pair).

That is, when an eNB transmits an E-PDCCH to a specific UE, a parameter associated with the DMRS for the E-PDCCH may be configured with respect to each E-PDCCH related resource. Although the DMRS parameter may be, for example, antenna ports and a scrambling sequence (or an initial value of the scrambling sequence) as described previously, the present invention is not limited thereto and other parameters associated with the DMRS may be used. The starting eCCE of the candidate position refers to a CCE having the lowest index among L CCEs constituting a corresponding position at a specific candidate position of an aggregation level L formed by aggregating L CCEs. (In the case of a localized E-PDDCH,) L eCCEs constituting a single E-PDCCH may be transmitted with the same DMRS antenna port or scrambling sequence. The subset in the PRB pair refers to a subset of REs formed by splitting REs belonging to one PRB pair into two or more subsets. A plurality of E-PDCCHs may be multiplexed in a single PRB pair using different subsets. (For example, one PRB pair may include 4 eCCEs, each having 4 enhanced REGs (eREGs). A localized E-PDCCH may be transmitted in units of an eCCE and a distributed E-PDCCH may be transmitted by forming one eCCE with eREGs belonging to different PRB pairs. Plural eCCEs may be used for one E-PDCCH (or DCI) transmission according to an aggregation level). In addition, the scrambling sequence (or the initial value of the scrambling sequence) may be generated as a cell ID, a serving cell ID (SCID) field, or a combination of the cell ID, the SCID, and other various parameters. The scrambling sequence may be changed by varying all or some of these parameters.

One embodiment related a PRB pair among the above-mentioned resources associated with E-PDCCH transmission, will now be described. According to the present invention, when an E-PDCCH is transmitted using at least one PRB pair among a plurality of PRB pairs, a DMRS parameter for the E-PDCCH is configured for each of the plurality of PRB pairs (The plurality of PRB pairs may be referred to as an E-PDCCH set, and a UE may detect a candidate by blind decoding from the E-PDCCH set and determine whether the E-PDCCH is actually transmitted via the candidate through blind decoding). The plurality of PRB pairs may include one or more PRB pairs for localized E-PDCCH transmission and/or one or more PRB pairs for distributed E-PDCCH transmission, as illustrated in FIG. 11.

In consideration of the above description, according to the proposal of the present invention, the DMRS parameter (e.g. a DMRS port and/or scrambling sequence parameter) may be configured with respect to each E-PDCCH set (or E-PDCCH sets) signaled for E-PDCCH transmission and the E-PDCCH set is for a localized E-PDCCH or is for a distributed E-PDCCH.

That is, when a DMRS parameter is a scrambling sequence (or an initial value of the scrambling sequence), the scrambling sequence (or the initial value of the scrambling sequence) is configured with respect to each PRB pair set. The scrambling sequence (or the initial value of the scrambling sequence) configured with respect to each PRB pair set may be transmitted to a UE through higher layer signaling (RRC signaling). If the DMRS parameter is antenna ports, the antenna ports may be configured with respect to each PRB pair set for localized/distributed E-PDCCH transmission. For example, as illustrated in later-described FIG. 11, for one or more PRB pair sets for localized E-PDCCH transmission, antenna ports {7, 8, 9, 10} may be configured and, for a PRB pair set for distributed E-PDCCH transmission, antenna ports {7, 9, 7, 9} may be configured. As is the case of the scrambling sequence, information regarding the antenna ports associated with a PRB pair may be transmitted to the UE through higher layer signaling.

FIG. 9 illustrates assignment of different antenna ports to a PRB pair set for localized E-PDCCH transmission and a PRB pair set for distributed E-PDCCH transmission in the case in which a DMRS parameter (especially, antenna ports) is configured for one or more PRB pairs.

As described above, E-PDCCH transmission may be divided into localized transmission and distributed transmission according to a transmission scheme. E-PDCCH transmission schemes may be differentiated according to whether one eCCE is dividedly transmitted on a plurality of PRB pairs. That is, division transmission of one eCCE on a plurality of PRB pairs may be distributed transmission and a resource set dividedly defined from one eCCE may be an eREG. Antenna ports used in each resource set may be differently configured. When an antenna port configuration is applied in association with the transmission scheme, the antenna port configuration may differ according to the transmission scheme.

Specifically, referring to FIG. 9, it is assumed that one PRB pair includes 8 eREGs and two eREGs having consecutive indexes constitutes one eCCE in localized transmission. The eREGs in one PRB pair may be defined by frequency division multiplexing (FDM), time division multiplexing (TDM), or FDM and TDM or may be defined by an interleaving scheme for interference randomization. Configuration of one eCCE with non-consecutive two eREGs in localized/distributed transmission is also embraced in the scope of the present invention.

Referring to FIG. 9 (a), localized transmission is configured by antenna ports {7, 8, 9, 10} starting from an eCCE of a low index and distributed transmission is configured by antenna ports {7, 7, 7, 7}. In consideration of assignment of antenna ports in units of an eREG, antenna ports {7, 7, 8, 8, 9, 9, 10, 10, 11, 11} are allocated for localized transmission and antenna ports {7, 7, 7, 7, 7, 7, 7, 7} are allocated for distributed transmission.

In FIG. 9(b), antenna ports allocated in units of an eREG are illustrated. It is assumed that for localized transmission, antenna ports {7, 7, 9, 9, 8, 8, 10, 10} are allocated and, for distributed transmission, antenna ports {7, 9, 7, 9, 7, 9, 7, 9} are allocated. Assuming that antenna port allocation is determined in units of an eCCE for localized transmission, allocation of antenna ports {7, 9, 8, 10} may be signaled or pre-configured. If it is desired to use mapping in units of an eCCE even for distributed transmission, a method for configuring antenna ports {7, 9, 7, 9, 7, 9, 7, 9} of FIG. 9(b) as {7, 7, 9, 9, 7, 7, 9, 9} may be considered and antenna ports {7, 9, 7, 9} are mapped in eCCEs.

The relationship between an eCCE (or eREG) in a PRB pair and an antenna port may be preconfigured per transmission scheme and a PRB pair set to which each scheme is applied may be signaled to a UE.

FIG. 10 exemplarily illustrates a change of pattern of a DMRS parameter to a specific pattern in the case in which a DMRS parameter is configured in units of a PRB (or a PRB pair). That is, an eNB may inform a UE of a change pattern of an antenna port and/or a scrambling sequence of a DMRS through higher layer signaling. As one method, the eNB may inform the UE of an antenna port and/or a scrambling sequence to be used at a specific position and the UE may operate to derive antenna ports and/or scrambling sequences to be used at the other positions through a predetermined rule from the known antenna port and/or scrambling sequence. It may be understood that the eNB assigns the UE an offset value for a position at which a pattern is started in a situation in which an antenna port and/or a scrambling sequence of a DMRS to be used at each position is determined as a predetermined pattern.

This will be described in detail with reference to FIG. 10. In FIG. 10(a), each RB (RB pair) alternately uses antenna ports 7, 8, 9, and 10 when an SCID is fixed to 0 and this may be represented that RB nx uses antenna port (7+(x mod 4). In this case, assuming that an offset value is set to 0, this may represent that RB nx uses antenna port (7+((x+offset) mod 4))). Since antenna ports 7, 8, 9, and 10 are used in the above example, the total number of DMRS antenna ports, $M_{port}$, used by a corresponding UE to receive an E-PDCCH is 4. $M_{port}$ may differ according to a UE and may also be configured through a higher layer signal. In this case, an antenna port of RB nx may be generalized as Equation 7.

$$(7+((x+\text{offset}) \bmod M_{port})) \qquad [\text{Equation 7}]$$

FIG. 10(b) explains that RB nx uses an SCID (floor(x/4)+offset) mod 2) in which an offset is set to 0.

Alternatively, an antenna port number used in each RB may be expressed as a combination of an antenna port change period $Period_{port}$ and a first used antenna port number $Start_{port}$. That is, an antenna port number may be expressed such that antenna port $(7+Start_{port})$ is used in first $Period_{port}$ RBs and antenna port $(7+Start_{port}+1)$ is used in next $Period_{port}$ RBs. Accordingly, an antenna port used in RB nx may be expressed by Equation 8.

$$(7+((Start_{port}+floor(x/Period_{port}) \bmod M_{port}) \quad [\text{Equation 8}]$$

When Equation 8 is applied, FIG. 10(a) corresponds to the case in which $Start_{port}=0$, $Period_{port}=1$, and $M_{port}=4$ and FIG. 10(c) corresponds to the case in which $Start_{port}=0$, $Period_{port}=2$, and $M_{port}=4$.

While the above description has been given under the premise that a DMRS antenna port number and a scrambling sequence are changed in each RB, this is exemplary and the DMRS antenna port number and the scrambling sequence may differ according to a PRB pair set, a starting eCCE of a candidate position, and/or a subset in a PRB pair.

FIG. 11 exemplarily illustrates an antenna port configuration for each UE based on Equation 8. Specifically, in FIG. 11, antenna ports for UE1, UE2, and UE3 are configured when $Start_{port}=0$, 0, and 1 and $Period_{port}=1$, 2, and 4, respectively. As a result, a combination of UEs having the same antenna port in a specific RB becomes different as illustrated in FIG. 11. Accordingly, an eNB may variously select a possible MU-MIMO pairing in each RB. For example, in RB n0 and RB n7, one of UE1 and UE2 having the same antenna port is selected to perform MU-MIMO with UE3, whereas in RB n1 and RB n6, one of UE3 and UE1 having the same antenna port is selected to perform MU-MIMO with UE2. That is, various MU-MIMO pairing can be performed relative to the case in which DMRS antenna ports are uniformly configured over all RBs.

A pattern in which a DMRS antenna port and/or a scrambling sequence to be used in each RB (or a PRB pair set, a starting CCE of a candidate position, and/or a subset in an RB) is changed may differ according to a C-RNTI allocated to a UE, a cell ID, and a scrambling parameter of a CSI-RS and thus it is guaranteed that each UE has a different pattern. In addition, an antenna port pattern may be determined with priorities between parameters. For example, priorities may be determined in order of a CSI-RS scrambling parameter, a cell ID, and a C-RNTI and antenna port assignment may be reconfigured using available parameters at a reconfiguration message reception time. If a parameter corresponding to priority is not available, a parameter with the next priority may be used to determine the pattern. The above parameters may be differently applied according to a transmission form. For example, in localized transmission, a C-RNTI may be used to determine an antenna port pattern and, when a shared RS is used, the antenna port pattern may be determined based on a cell ID, a virtual cell ID used in a DMRS or a CSI-RS, or a scrambling parameter because a plurality of E-PDCCHs share the same antenna port.

The above description has been given on the premise that the number of REs available for an E-PDCCH in one PRB pair is sufficient. However, the number of REs available for an E-PDCCH in one PRB pair may be reduced in an extended CP of FDD/TDD, a subframe (or a PRB pair set) in which a PBCH/SCH is transmitted, a special subframe of TDD, or a subframe (or a PRB pair set) with significant RS overhead such as CRS/CSI-RS/DMRS overhead.

In this way, if the amount of resources available for the E-PDCCH is insufficient and an eCCE (or an eREG) is configured only by available resources (i.e. if the eCCE (or eREG) is configured only by REs used for E-PDCCH transmission), the positions of REs constituting the eCCE (or eREG) in a PRB pair may differ according to a subframe (or a PRB pair). Accordingly, the linkage between an index of the eCCE (or eREG) in the PRB pair and an antenna port may be predetermined (this may be transmitted through higher layer signaling). If the number of eCCEs (or eREGs) is less than the number of configured antenna ports per PRB pair, it is proposed that only the available number of antenna ports be used starting from a determined index (e.g. from a low index or from a high index).

Figure 12:
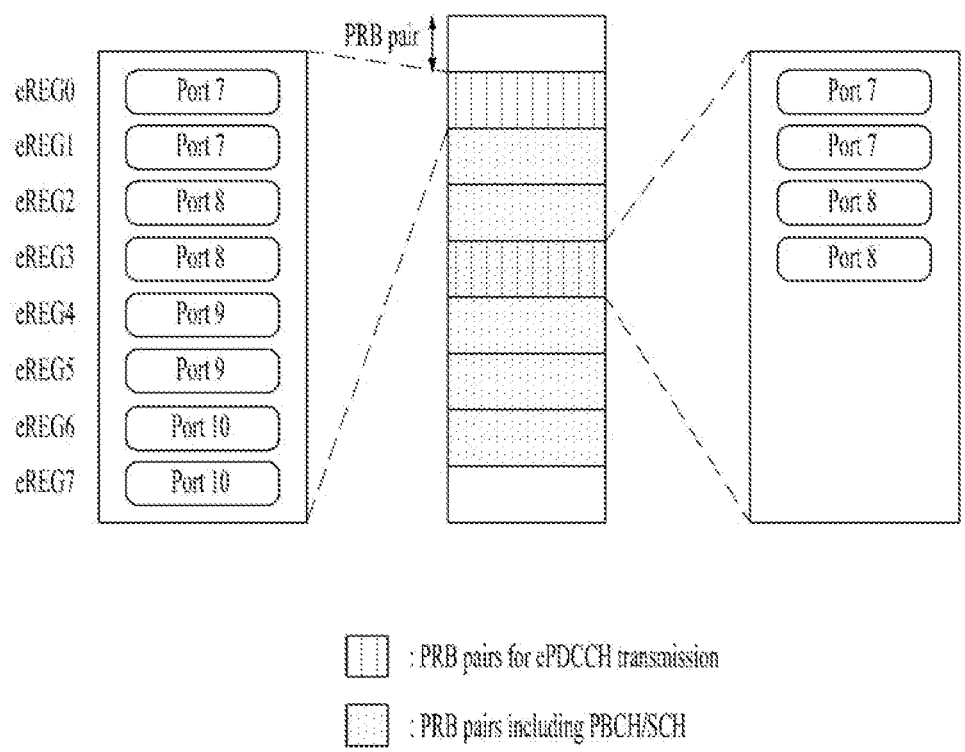

FIG. 12 illustrates the above example. In FIG. 12, it is assumed that the number of resources available for an E-PDCCH in each of shaded PRB pairs is reduced to half the available number of resources in a normal PRB pair because the shaded PRB pairs include the PBCH/SCH. Accordingly, if the number of eCCEs per PRB pair in a normal PRB pair is 4, the number of eCCEs in the shade PRB pair is reduced to 2 from 4. It is assumed that signaled or predefined mapping of an eCCE to an antenna port for a corresponding UE is determined in order of antenna ports {7, 8, 9, 10} starting from an antenna port having a low index in a PRB pair. As in FIG. 9, it is also assumed that two consecutive eREGs constitute one eCCE. In consideration of mapping in units of an eREG, in a normal PRB pair of the left side of FIG. 12, eREG-to-antenna port mapping of {7, 7, 8, 8, 9, 9, 10, 10} is performed and, in a PRB pair of the right side of FIG. 12 in which the number of eCCEs is reduced to 2 from 4, eREG-to-antenna port mapping of {7, 7, 8, 8} may be performed.

Similarly, in TDD, eCCE (or eREG)-to-antenna port mapping in a normal subframe (or a subframe with sufficiently available resources) for an E-PDCCH may be signaled or preconfigured and only a part of antenna ports used for eCCE (or eREG)-to-antenna port mapping may be used in a special subframe in which the available number of resources is reduced. Further, when overhead is further generated (e.g. due to an RS), only one antenna port (e.g. antenna port {7}) may be used.

The above description may be interpreted in a logical domain as follows. If all eCCEs (or eREGs) for an E-PDCCH are indexed, eREG indexes 0 to 11 (eCCE indexes 0 to 5) may be derived with respect to two PRB pairs and eCCE (or eREG)-to-antenna port mapping in a PRB pair, that is, {7, 7, 8, 8, 9, 9, 10, 10} may be interpreted starting from a resource set having the lowest index in a PRB pair. For example, in FIG. 12, resource set indexes in a PRB pair in which the PBCH/SCH is transmitted may be 8, 9, 10, and 11 and this may mean that antenna ports {7, 7, 8, 8} are mapped to eREGs 8 to 11 by applying mapping of antenna ports {7, 7, 8, 8, 9, 9, 10, 10}.

As a method different from that described with reference to FIG. 12, use of specific antenna ports among antenna ports mapped when resources for an E-PDCCH are sufficient may be signaled. This method may be used especially for interference coordination, RS collision avoidance, etc.

For example, a network may determine priority for antenna port mapping when resources for an E-PDCCH are sufficient and then if the number of antenna ports is reduced, the network may determine antenna ports based on the priority. In this case, a plurality of priorities may be predetermined and a specific priority may be selected based on a cell ID, a UE ID (C-RNTI), a virtual cell ID, etc. The priorities will be transmitted through higher layer signaling.

Alternatively, a method for configuring subsets for antenna port assignment according to the number of antenna ports and determining antenna port mapping to be used among subsets corresponding to the reduced number of antenna ports based on a cell ID, a UE ID (C-RNTI), a virtual cell ID, etc. may be used.

As described above, in the case of use of a shared RS and a high aggregation level, the lesser number of antenna ports may be used in one PRB pair, as is the case when the number of antenna ports is reduced due to shortage of the amount of resources in a PRB pair. The shared RS may be useful when decoding of plural E-PDCCHs is performed through one antenna port and when CSI feedback is incorrect or a common control signal is transmitted. In a high aggregation level, a plurality of eCCEs (or eREGs) may be used for one DCI transmission. If plural antenna ports are used, since complexity of channel estimation increases, single antenna port transmission is suitable. If the amount of resources in a PRB pair is insufficient, for example, in a special subframe, since assignment of multiple antenna ports to a corresponding PRB pair generates unnecessary resource consumption, it is desirable to allocate a number of antenna ports suitable for the amount of resources.

In E-PDCCH transmission, RS collision with a neighboring cell should be considered and, when RS collision occurs, a UE especially located at a cell edge may decrease in E-PDCCH performance. For example, this case is generated when a DMRS antenna port for an E-PDCCH from a serving cell is equal to a DMRS port used by a neighboring cell for a PDSCH. As one of methods for solving this problem, different antenna ports may be allocated to neighboring cells (or transmission points). However, this method generates signaling overhead caused by UE-specific signaling. As another method, when a lesser number of RSs is used for E-PDCCH transmission, specific antenna ports (e.g. antenna ports 9 and 10) may be configured to be used first in order to avoid RS collision. For example, when one port per PRB pair is allocated, antenna port 9 or 10 may be used or antenna ports 9 and 10 may be repeated in units of a resource set (e.g. an eREG or eCCE). In other words, antenna ports different from frequently used antenna ports 7 and 8 during DMRS transmission for a PDSCH in a neighboring cell may be generally used first. In this context, a more detailed description will be given below by distinguishing between the case in which resources for use of a shared RS/E-PDCCH are not sufficient and the case in which a high aggregation level is used.

First, when resources for use of a shared RS/E-PDCCH are not sufficient, specific antenna ports may be used first. For example, as many antenna ports as the number of necessary RS antenna ports may be allocated with priority of antenna ports 10, 9, 8, and 7. As an example, antenna port 10 may be used when one antenna port is allocated, antenna ports 9 and 10 may be used when two antenna ports are allocated, and antenna ports 9, 10, and 8 may be used when three antenna ports are allocated. Alternatively, if MU-MIMO is not applied to a PDSCH transmission of a neighboring cell, antenna ports may be selected by excluding antenna port 7 which is mainly used, first. Furthermore, when only two of four antenna ports are used, since antenna ports may be configured by a combination of antenna ports belonging to different CDM groups (e.g. antenna ports 7 and 9 or antenna ports 8 and 10) for power amplification gain, a neighboring cell has a high probability of using these antenna ports 7 and 9 and thus specific antenna ports 8 and 10 may be used.

Next, when a high aggregation level is used, a representative antenna port may be used. An antenna port allocated to an eCCE of the lowest index of eCCEs of a corresponding PRB pair may be determined as the representative antenna port. That is, antenna ports may be allocated such that antenna ports 9 and 10 are arranged on the lowest index. If an antenna port of a specific eCCE including the case of using the lowest index is selected as the representative antenna port, antenna port 9 or 10 may be determined as the representative antenna port using the same method. Antenna ports allocated to a corresponding PRB pair may be {9, 10, 7, 8}, {10, 9, 7, 8}, {9, 10, 8, 7}, or {10, 9, 8, 7} when one PRB is divided into four eCCEs. Alternatively, unlike the above description, if a high aggregation level is configured, antenna port 9 or 10 is used irrespective of an eCCE. Since collision avoidance may be possible through scheduling in the case of aggregation level 2, a high aggregation level may be 4 or more.

Figure 13:
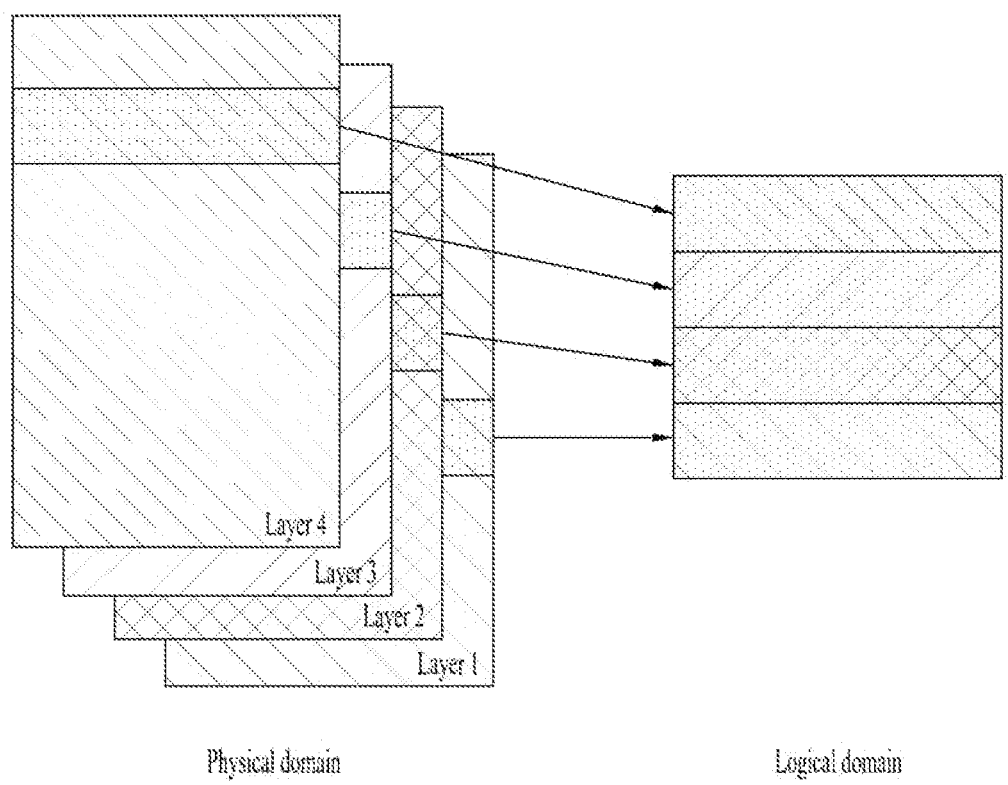

The above description has proposed that a DMRS configuration per unit resource set (e.g. PRB pair (set), subset per PRB pair (eCCE), etc.) for E-PDCCH transmission be determined through RRC signaling. Such description (e.g. a UE may use a different DMRS configuration per E-PDCCH transmission unit for E-PDCCH detection and the DMRS configuration per transmission unit may be indicated using RRC signaling) may be interpreted as two methods described below. Hereinafter, for description, the terms physical domain and logical domain will be used. The physical domain refers to resource arrangement in OFDM symbol mapping and the logical domain refers to resource arrangement for partial resources signaled for E-PDCCH detection in the physical domain. FIG. 13 illustrates the relationship between the physical domain the logical domain, wherein the logical domain may be a domain in which resources corresponding to a search space of an E-PDCCH are arranged. While the above description has been given focusing upon a single domain, the present invention is applicable to transmission using a plurality of layers as illustrated in FIG. 13.

As the first interpretation, an eNB may determine a DMRS configuration per unit resource in a physical domain and assign a search space for E-PDCCH detection per UE. In this case, the eNB may signal the DMRS configuration per resource unit in the physical domain to each UE. The afore-proposed pattern signaling scheme may be applied to signal the DMRS configuration per corresponding resource, thereby reducing signaling overhead. FIG. 14(a) illustrates the case in which plural antenna ports are configured on one layer in a physical domain. Obviously, the number of layers may increase and multiple DMRS parameters such as scrambling sequence parameters may be configured.

Figure 14:
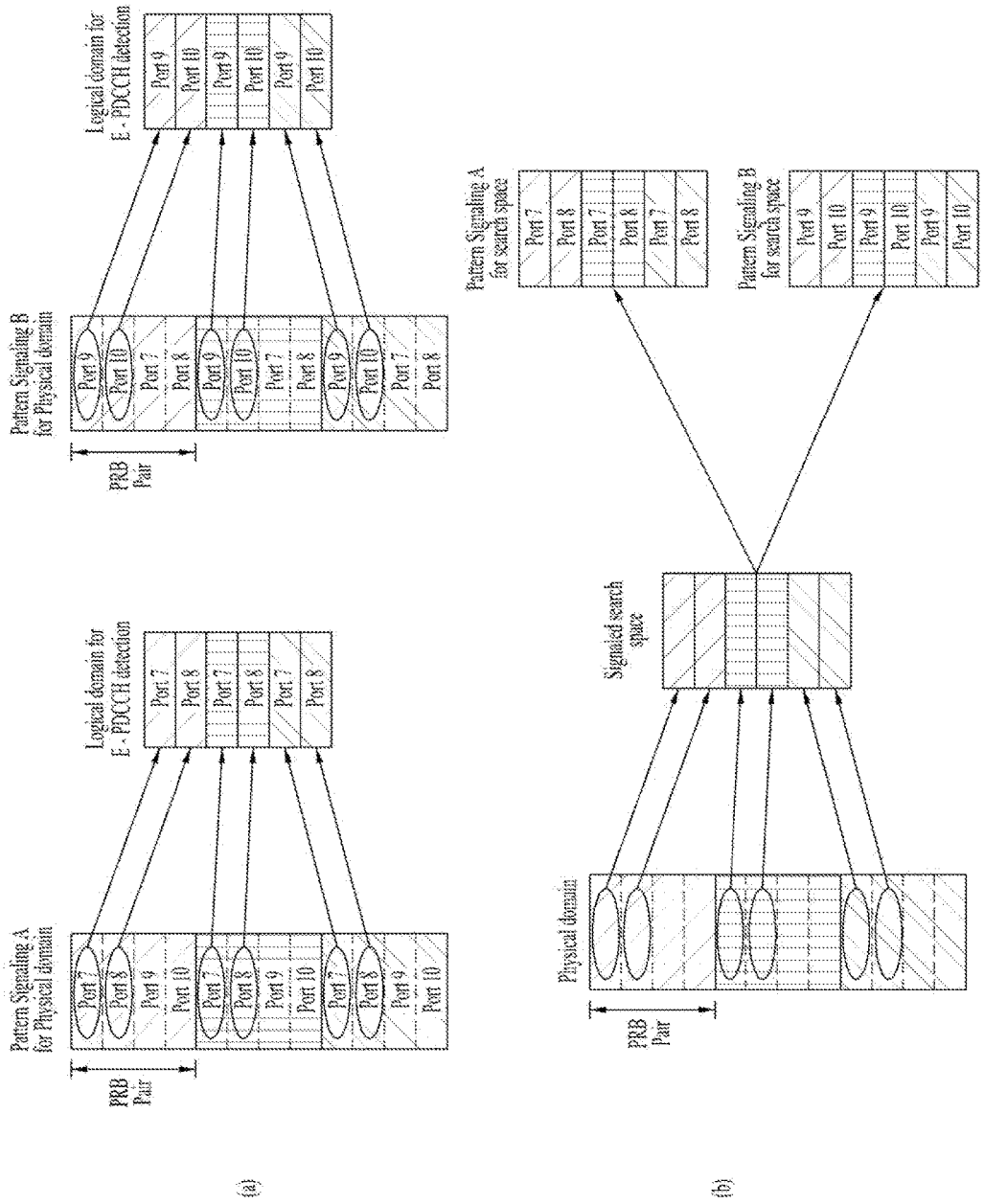

Although it is assumed in FIG. 14(a) that one PRB pair is divided into four subsets and one subset is used as a basic unit of E-PDCCH transmission, the present invention may be applied when a resource unit for E-PDCCH transmission is a PRB pair or multiple PRB pairs. In FIG. 14, an eNB may indicate a pattern for antenna ports used for each subset in a physical domain to a UE through RRC signaling and a DMRS configuration for E-PDCCH detection may be finally determined through signaling for a search space. The pattern for antenna ports may be configured such that antenna ports 7, 8, 9, and 10 are repeated as in pattern signaling A in the left of FIG. 14(a) or antenna ports 9, 10, 7, and 8 are repeated as in pattern signaling B in the right of FIG. 14(a). In summary, a DMRS configuration for an eCCE is signaled in the physical domain and then a search space configuration is signaled.

As the second interpretation, a pattern for each resource unit is signaled in a logical domain. That is, as illustrated in FIG. 14(b), information about a search space is signaled in the physical domain as in legacy LTE/LTE-A and then a pattern to be used in a corresponding search space may be signaled in the logical domain. While the above description has been exemplarily given focusing upon configuration signaling for antenna ports, the present invention may be applied even to a plurality of parameters usable for a DMRS configuration, such as scrambling sequence parameters.

Figure 15:
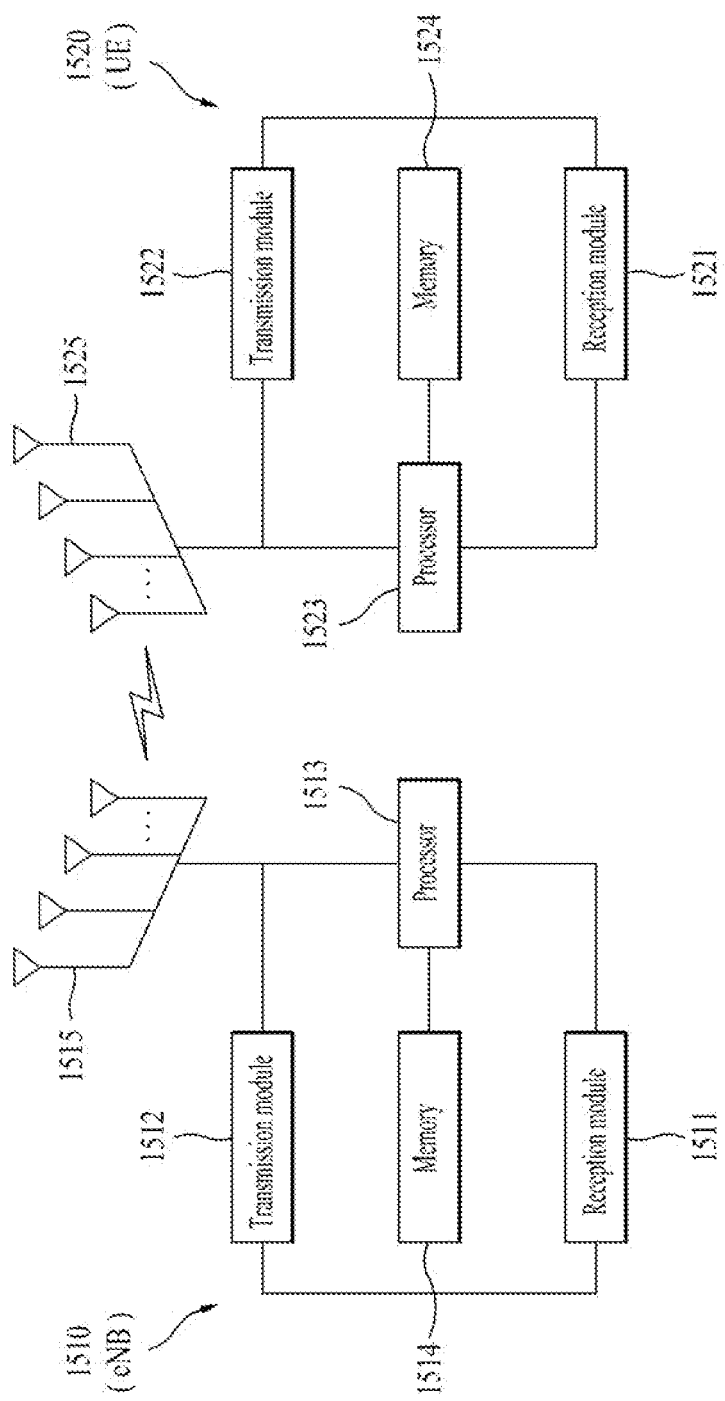
FIG. 15 is a view illustrating transmitting and receiving devices.

FIG. 15 is a block diagram of a transmission point and a UE according to an embodiment of the present invention.

Referring to FIG. 15, a transmission point 1510 according to the present invention may include a reception module 1511, a transmission module 1512, a processor 1513, a memory 1514, and a plurality of antennas 1515. The transmission point 1510 supports MIMO transmission and reception through the plural antennas 1515. The reception module 1511 may receive signals, data, and information on UL from the UE. The transmission module 1512 may transmit signals, data, and information on DL to the UE. The processor 1513 may control overall operation of the transmission point 1510.

The processor 1513 of the transmission point 1510 according to an embodiment of the present invention may process operations necessary for above-described measurement reporting, handover, random access, etc.

The processor 1513 of the transmission point 1510 may process information received by the transmission point 1510 or information to be transmitted from the transmission point 1510. The memory 1514 may store processed information for a predetermined time and may be replaced with a component such as a buffer (not shown).

Referring to FIG. 15, a UE 1520 may include a reception module 1521, a transmission module 1522, a processor 1523, a memory 1524, and a plurality of antennas 1525. The UE 1520 supports MIMO transmission and reception through the plural antennas 1525. The reception module 1521 may receive signals, data, and information on DL from the transmission point. The transmission module 1522 may transmit signals, data, and information on UL to the transmission point. The processor 1523 may control overall operation of the UE 1520.

The processor 1523 of the UE 1520 according to an embodiment of the present invention may process operations necessary for above-described measurement reporting, handover, random access, etc.

The processor 1523 of the UE 1520 may process information received by the UE 1520 or information to be transmitted from the UE 1520. The memory 1524 may store processed information for a predetermined time and may be replaced with a component such as a buffer (not shown).

The above transmission point and the UE may be configured to implement the foregoing embodiments independently or implement two or more of the embodiments simultaneously. For clarity, a repeated description will be omitted herein.

The description of the transmission point 1510 in FIG. 15 may apply to a relay node as a DL transmission entity or a UL reception entity and the description of the UE 1520 in FIG. 15 may apply to the relay node as a DL reception entity or a UL transmission entity.

The above-described embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSP), digital signal processing devices (DSDPs), programmable logic devices (PLDs), field programmable gate arrays (FPGAs), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to limit the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

The invention claimed is:
1. A method for transmitting control information by a base station in a wireless communication system, the method comprising:
    transmitting an enhanced physical downlink channel (E-PDCCH) to a user equipment, using at least one or more physical resource block (PRB) pairs among a plurality of PRB pairs for E-PDCCH transmission,
    wherein the plurality of PRB pairs include one or more PRB pair sets,
    wherein one or more initial values of a scrambling sequence used to generate a demodulation reference signal (DMRS) for the E-PDCCH are respectively configured for the one or more PRB pair sets,
    wherein, if the E-PDCCH is related to a localized transmission, each antenna port of plurality of antenna ports is allocated to enhanced control channel elements (eC-CEs) in the one or more PRB pairs, and wherein, if the E-PDCCH is related to a distributed transmission, two antenna ports are allocated in an alternating manner to enhanced resource element groups (eREGs) in the one or more PRB pairs.

2. The method according to claim 1, wherein the plurality of PRB pairs include a minimum of four resource units for transmitting the E-PDCCH.

3. The method according to claim 1, wherein only partial antenna ports among preset antenna ports for the PRB pairs are used when resources available for the E-PDCCH in the physical resource pairs decreases.

4. The method according to claim 1, wherein the two antenna ports used in the distributed transmission are also available in the localized transmission.

5. A base station in a wireless communication system, the base station comprising:
    a transmission module; and
    a processor,
    wherein the processor transmits an enhanced physical downlink channel (E-PDCCH) to a user equipment, using at least one or more physical resource block (PRB) pairs among a plurality of PRB pairs for E-PDCCH transmission,
    wherein the plurality of PRB pairs include one or more PRB pair sets,
    wherein one or more initial values of a scrambling sequence used to generate a demodulation reference signal (DMRS) for the E-PDCCH are respectively configured for the one or more PRB pair sets,
    wherein, if the E-PDCCH is related to a localized transmission, each antenna port of plurality of antenna ports is allocated to enhanced control channel elements (eCCEs) in the one or more PRB pairs, and
    wherein, if the E-PDCCH is related to a distributed transmission, two antenna ports are allocated in an alternating manner to enhanced resource element groups (eREGs) in the one or more PRB pairs.

6. The base station according to claim 5, wherein the two antenna ports used in the distributed transmission are also available in the localized transmission.

* * * * *